United States Patent [19]

Abe et al.

[11] Patent Number: 4,696,892
[45] Date of Patent: Sep. 29, 1987

[54] OPTICAL INFORMATION RECORDING MEDIUM

[75] Inventors: Michiharu Abe; Masaakira Umehara; Tsutomu Sato; Hideaki Oba; Yutaka Ueda, all of Yokohama; Makoto Kunikane, Chigasaki, all of Japan

[73] Assignee: Ricoh Co., Ltd., Tokyo, Japan

[21] Appl. No.: 706,221

[22] Filed: Feb. 27, 1985

[30] Foreign Application Priority Data

Mar. 6, 1984 [JP] Japan .................................. 59-41240

[51] Int. Cl.$^4$ ........................ G03C 1/00; G01D 15/10; G01D 9/00
[52] U.S. Cl. .................................. 430/495; 430/945; 346/76 L; 346/135.1
[58] Field of Search .............. 430/495, 945; 346/76 L, 346/135.1

[56] References Cited

U.S. PATENT DOCUMENTS

| | | | |
|---|---|---|---|
| 4,239,338 | 12/1980 | Borrelli et al. ...................... | 350/155 |
| 4,275,141 | 6/1981 | Borrelli et al. ...................... | 430/270 |
| 4,405,706 | 9/1983 | Takahashi et al. .................. | 430/271 |
| 4,412,231 | 10/1983 | Namba et al. ...................... | 346/135.1 |
| 4,458,004 | 7/1984 | Tanikawa ............................ | 430/270 |
| 4,460,665 | 7/1984 | Kunikane et al. ................... | 428/199 |
| 4,465,767 | 8/1984 | Oba et al. ............................ | 430/271 |
| 4,477,555 | 10/1984 | Oba et al. ............................ | 430/273 |
| 4,492,750 | 1/1985 | Law et al. ............................ | 430/494 |
| 4,504,548 | 3/1985 | Esho et al. ........................... | 428/426 |
| 4,510,275 | 4/1985 | Ihikura et al. ....................... | 523/412 |
| 4,536,471 | 8/1985 | Nishi et al. .......................... | 430/495 |
| 4,539,572 | 9/1985 | Robbins et al. ..................... | 346/135.1 |
| 4,569,881 | 2/1986 | Freese et al. ........................ | 428/213 |
| 4,578,684 | 3/1986 | Gupta et al. ........................ | 346/135.1 |
| 4,581,317 | 4/1986 | Simmons, III ...................... | 430/270 |
| 4,587,198 | 5/1986 | Fisch ................................... | 430/201 |
| 4,602,263 | 7/1986 | Borror et al. ....................... | 346/201 |

*Primary Examiner*—John E. Kittle
*Assistant Examiner*—Patrick J. Ryan
*Attorney, Agent, or Firm*—Flynn, Thiel, Boutell & Tanis

[57] ABSTRACT

This invention relates to an optical information recording medium, characterized in that on a substrate there is applied a coloring matter film chemically inert to said substrate, said coloring matter film having an extinction coefficient of at least 1.

14 Claims, 4 Drawing Figures

OPTICAL INFORMATION RECORDING MEDIUM

BACKGROUND OF THE INVENTION a. Field of the Invention

The present invention relates to an optical information recording medium which can be additionally recorded. More particularly, the present invention relates to a reflective type optical information recording medium having a coloring matter film on a substrate.

b. Description of the Prior Art

There is known an optical information recording medium using a coloring matter film as a recording layer. That is, this type of recording medium basically comprises a substrate and coloring matter film. One side of the substrate comes in contact with the coloring matter film and the other side of the substrate comes in contact with air or a protective layer. Since this type of recording medium can be manufactured by a highly productive process such as coating, it has merit in that it can be industrially produced at a low cost. However, on the contrary, it has a demerit in that it is technically and economically hard to select a satisfactory material for forming a coloring matter film.

SUMMARY OF THE INVENTION

An object of the present invention is to provide an optical information recording medium having stable recording and regenerating properties by laser light without having the conventional unstable factors of the above mentioned demerit.

More particularly, an object of the present invention is to provide an optical information recording medium, characterized in that on a substrate there is applied a coloring matter film chemically inert to said substrate, said coloring matter film having an extinction coefficient of at least 1.

DETAILED DESCRIPTION OF THE INVENTION

In order to achieve the above object, we have studied and investigated various types of coloring matters, and discovered as the invention that it is necessary for a satisfactory optical information recording medium to select a coloring matter material having such a high reflectivity as required for regenerating information and such a high light absorptivity as required for recording information. That is, the present invention resides in the selection of a coloring matter film having an extinction coefficient of at least 1 for a satisfactory optical information recording medium.

Figure 2:
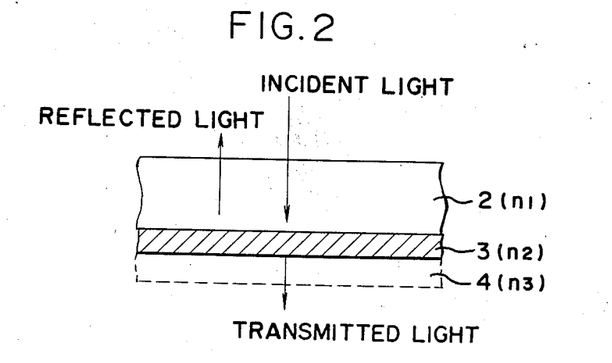
FIG. 2 illustrates the relation of reflection and absorption with the optical information recording medium.

The extinction coefficient $K_i$ is determined by the following equation.

$$n_i = N_i - K_i \sqrt{-1}$$

wherein $n_i$ represents a complex refractive index of each element; $N_i$ represents a refractive index of each element; and $K_i$ represents an extinction coefficient. For example, if this is further explained in accordance with FIG. 2, $n_1$ represents a complex refractive index of a substrate; $n_2$ represents that of a coloring matter film; and $n_3$ represents that of air or a protective layer. The other values are defined in the same manner as above.

Reflectivity and absorptivity of an optical information recording medium are determined by the thickness of a coloring matter film and optical constants in accordance with the following equations.

$$\text{Reflectivity } (R): R = |r|^2$$

$$\text{Transmissivity } (T): T = |t|^2 \times \frac{N_3}{N_1}$$

$$\text{Absorptivity } (A): A = 1 - R - T$$

$$\text{Amplitude Transmissivity } (t): t = t_{23}\left(\frac{t_{12}t_2}{1-c}\right)$$

$$\text{Amplitude Reflectivity } (r): r = r_{12} + t_2 r_{23}\left(\frac{t_{12}t_2}{1-c}\right)$$

$$c = r_{21}r_{23}t_2$$

$$t_{ij} = \frac{2n_i}{n_i + n_j}$$

$$r_{ij} = \frac{n_j - n_i}{n_i + n_j}$$

$$t_i = \exp\sqrt{-1}\left(\frac{2\pi}{\lambda} Z n_i\right)$$

wherein $\lambda$ represents a wavelength of laser light used and Z represents a thickness of a coloring matter film.

Thus, the coloring matter film of the present invention having an extinction coefficient of at least 1 has high reflectivity of not less than 16% and provides a recording medium having excellent properties in view of high sensitivity and C/N value. If the extinction coefficient of a coloring matter film is large, recording laser light is absorbed even when the film thickness is very thin (500 Å or less) and accordingly a satisfactory recording pit is formed. Furthermore, as can be seen from the above equation, if the extinction coefficient is large, not only light absorption but also reflectivity becomes high (this is proved by calculating by substituting the values of N, K and Z for the above equation).

Figure 3:
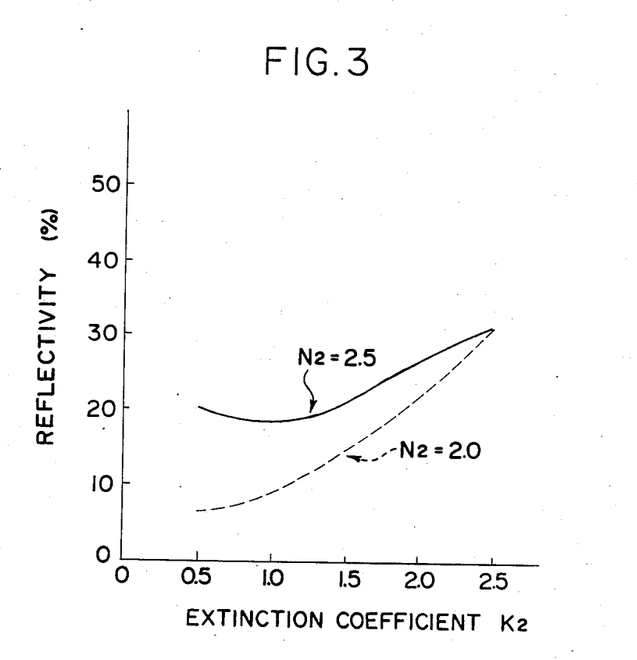
FIG. 3 shows the relation between extinction coefficient values and reflectivity.
Figure 4:
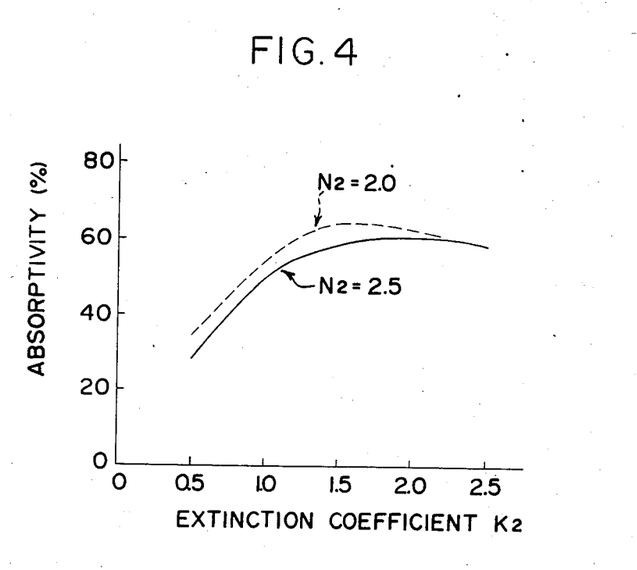
FIG. 4 shows the relation between extinction coefficient values and absorptivity.

FIGS. 3 and 4 show curves respectively illustrating the relation between reflectivity and extinction coefficient $K_2$ and the relation between absorptivity and extinction coefficient $K_2$.

These curves are obtained by calculating on the basis of the conditions of:

Complex refractive index, $n_1 = 1.5$; (acrylic resin substrate as shown in FIG. 2)

Complex refractive index, $n_3 = 1.0$; (air as shown in FIG. 2)

The thickness of coloring matter film, $Z = 500$ Å;

The wavelength of laser light, $\lambda = 790$ nm.

FIG. 3 shows the relation between the reflectivity and the extinction coefficient $K_2$ of coloring matter film, taking refractive index $N_2$ (real number) as a parameter. As can be seen from FIG. 3, the value of reflectivity varies by the values of both $K_2$ and $N_2$, but the reflectivity generally becomes higher accordingly as $K_2$ becomes higher.

FIG. 4 shows the relation between the absorptivity and the extinction coefficient $K_2$ of coloring matter film, taking refractive index $N_2$ (real number) as a parameter. As can be seen from FIG. 4, the value of absorptivity does not vary largely by the value of $N_2$, but varies largely depending on the value of $K_2$.

In order to raise a recording sensitivity important for an optical information recording medium, it is necessary to convert light energy into heat by efficiently absorbing incident laser light as much as possible. The absorptivity becomes 50% or higher if the value of $K_2$ is made 1 or more. Thus, as proved from these calculation curves, a coloring matter film having high reflectivity and high absorptivity can be obtained when the extinction coefficient $K_2$ is not less than 1.

In addition to the extinction coefficient condition, it is essential for the present invention that the coloring matter film (particularly, solvent used for coating coloring matter) is chemically inert to a substrate. If the coloring matter layer reacts with or dissolves the substrate, the boundary between the coloring matter and the substrate becomes unclear, thus leading to the decrease of reflectivity. For example, if the coloring matter and the substrate are mutually dissolved in each other, the reflectivity decreases to 5% or less.

The coloring matters used in the present invention are selected from those which satisfy the above conditions. Typical examples include triphenyl methane type coloring matter, triaryl methane type coloring matter and cyanine type coloring matter. More particularly, examples of suitable coloring matter include:

-continued cyanine type coloring matter (12)

cyanine type coloring matter (13)

cyanine type coloring matter (14)

cyanine type coloring matter (15)

cyanine type coloring matter (16)

cyanine type coloring matter (17)

cyanine type coloring matter (18)

A laser light used for the optical information recording medium of the present invention is selected depending on the absorption wavelength of coloring matter employed. For example, a helium neon laser, semi-conductor laser and the like can suitably be used.

The present invention is further described in accordance with the drawings.

Figure 1:
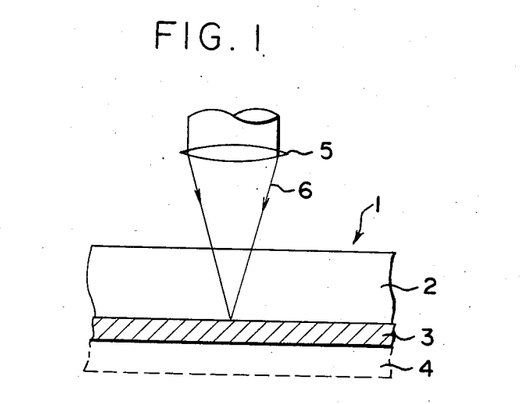
FIG. 1 illustrates the constitution of an optical information recording medium of the present invention.

As shown in FIG. 1, the recording medium 1 of the present invention basically comprises substrate 2 and coloring matter film 3. One side of the substrate comes in contact with coloring matter 3 and the other side of the substrate comes in contact with air or protective layer 4. When the recording medium of the present invention is used as an optical disk memory medium, recording and regeneration are conducted by an irradiating laser beam 6 condensed by condenser lens 5 through substrate 2. Thus, the substrate 2 must be transparent to laser light.

The recording of information is conducted by irradiating condensed beam 6 at a large power to change light energy absorbed by coloring matter film 3 into heat, thereby forming pits.

The regeneration of information is carried out by an irradiating condensed beam at such a small power as not to damage the coloring matter film and detecting the pits by light reflected by the coloring matter film.

Examples of a substrate 2 used in the present invention may be supports generally used for recording elements, for example, glass, quartz, ceramics, plastics, paper, plate-like or foil-like metal and the like. Among them, plastics are particularly suitable in the points of safety, improved recording sensitivity, flatness, light weight, workability and the like. Typical plastics include vinyl chloride resin, vinyl acetate resin, acrylic resin, methacrylic resin, polyester resin, nitrocellulose, polyethylene resin, polypropylene resin, polyamide resin, polystyrene resin, polycarbonate resin, epoxy resin and the like.

In order to efficiently conduct regeneration for reading an optical information recording medium, it is preferable to apply a pre-groove on a substrate. Preferable examples of the material for forming the pre-groove include light-curable materials such as acryl type or methacryl type resins.

The thickness of a coloring matter film 3 used in the present invention is generally 100 Å to 5 μm, preferably 200 to 1,000 Å. When this thickness is less than 100 Å, both reflectivity and absorptivity are lowered and a satisfactory recording can not be effected. On the other hand, when the recording layer is too thick, S/N value and sensitivity becomes bad and energy required for recording becomes too large, thus inconvenience being raised.

The coloring matter film of the present invention is formed by conventional methods such as vapor deposition, coating and the like. In a coating process, a dichoroethane solution is usually used, and in the case of cyanine type coloring matter, spin-coating process is particularly preferable.

If desired, the coloring matter film of the present invention may contain a binder resin and/or stabilizer such as antioxidant, light-resistant agent and the like to such an extent as not to make the extinction coefficient value (K) less than 1. When the value of K is large, light can be absorbed even by a thin film, and the energy required for forming pits can therefore be small. Accordingly, the periphery of pit is clear, and thus a noiseless and high sensitivity recording medium can be formed. Particularly, when K is higher than 1.5, the reflectivity becomes a preferable value in practical use, that is, higher than 20%.

If necessary, a protective layer 4 may be formed. The protective layer 4 is provided for the purposes of protecting a recording layer from damage, dust, dirt and the like and of improving the chemical stability of the recording layer. Examples of the protective layer material include ionomer resin, polyamide resin, vinyl type resin, natural high molecular compound, silicone, liquid rubber and the like, and in addition to said high molecular materials, various inorganic compounds can be used, for example, $SiO_2$, $MgF_2$, $SiO$, $TiO_2$, $ZnO_2$ and the like, metallic or half-metallic layers such as Zn, Cu, S, Ni, Cr, Ge, Se, Cd, Ag, Al and the like. The protective layer has a thickness more than 0.1 μm, preferably more than 50 μm.

Furthermore, if desired, an underlayer may be applied between the substrate 2 and the coloring matter film 3 as a recording layer. The underlayer is used for the purposes of (a) improving adhesion, (b) a barrier for water, gas and the like, (c) improving preservation stability of the recording layer and (d) improving reflectivity. For the purpose of (a), the above mentioned high molecular materials used in said protective layer can be used. For the purpose of (b), in addition to said high molecular materials, the above mentioned inorganic materials, metallic or half metallic materials and the like used in said protective layer can be used. For the purpose of (c), materials usable for the purposes of (a) and (b) can be used. For the purpose of (d), metals such as Ag, Al and the like can be used. The underlayer has a thickness of 0.1 to 200 μm, preferably 0.2 to 100 μm.

FIG. 2 illustrates the relationship of incident light, reflected light and transmitted light.

The present invention is further illustrated by the following Examples, but is not limited thereto.

EXAMPLE

A recording medium was prepared by spin-coating a solution obtained by dissolving a coloring matter in an appropriate solvent (as mentioned in the following Table) on an acryl resin substrate ("Acrylite AR" manufactured by Mitsubishi Rayon Co., Ltd.) having a thickness of 1 mm to form a coloring matter film having a thickness of 500 Å. With regard to the recording medium thus prepared, reflectivity and C/N value at a pit length of 0.9 μm were measured, and the results are shown in the following Table.

TABLE

| | Coloring Matter | Solvent | Laser Light (wavelength) | Extinction (Coefficient) K | Refractive Index N | Required* Recording Power (mW) | C/N** (dB) | Reflectivity (%) |
|---|---|---|---|---|---|---|---|---|
| Example | | | | | | | | |
| 1 | triarylmethane type coloring matter  | ethanol | He—Ne (633 nm) | 1.0 | 2.3 | 2.5 | 57 | 16 |
| 2 | cyanine type coloring matter  | dichloroethane (ethylene dichloride) | Laser Diode (790 nm) | 1.7 | 2.9 | 2.3 | 58 | 28 |
| 3 | cyanine type coloring matter  | dichloroethane | Laser Diode (790 nm) | 2.2 | 2.3 | 2.3 | 58 | 30 |

TABLE-continued

| | Coloring Matter | Solvent | Laser Light (wavelength) | Extinction (Coefficient) K* | Refractive Index N | Required* Recording Power (mW) | C/N** (dB) | Reflectivity (%) |
|---|---|---|---|---|---|---|---|---|
| 4 | cyanine type coloring matter | dichloroethane | Laser Diode (790 nm) | 1.6 | 2.8 | 2.3 | 58 | 26 |
| 5 | cyanine type coloring matter | dichloroethane | Laser Diode (790 nm) | 1.7 | 2.9 | 2.3 | 58 | 30 |
| 6 | cyanine type coloring matter | dichloroethane | Laser Diode (790 nm) | 2.0 | 2.5 | 2.3 | 58 | 29 |
| 7 | cyanine type coloring matter | ethanol | Laser Diode (790 nm) | 1.5 | 2.0 | 2.2 | 57 | 22 |
| 8 | cyanine type coloring matter | dichloromethane | Laser Diode (790 nm) | 1.6 | 2.0 | 2.3 | 58 | 20 |
| 9 | cyanine type coloring matter | dichloroethane | Laser Diode (790 nm) | 1.0 | 2.9 | 3.0 | 52 | 30 |
| 10 | cyanine type coloring matter | ethanol | Laser Diode (790 nm) | 1.8 | 2.3 | 2.2 | 55 | 20 |

TABLE-continued

| | Coloring Matter | Solvent | Laser Light (wavelength) | Extinction (Coefficient) K | Refractive Index N | Required* Recording Power (mW) | C/N** (dB) | Reflectivity (%) |
|---|---|---|---|---|---|---|---|---|
| 11 | triphenyl methane type coloring matter (structure shown) | ethanol | Ar (488) | 1.0 | 2.5 | 2.5 | 55 | 17 |
| 12 | (structure shown) is added to the coloring matter of Ex. 2 in an amount of 10 wt % as a stabilizer. | dichloroethane | Laser Diode (790 nm) | 1.6 | 2.8 | 2.3 | 58 | 26 |
| Comparative Example | | | | | | | | |
| 1 | Spirit Black 920 (C.I. Solvent Black 5) produced by Sumitomo Kagaku Ltd. | methanol | Laser Diode (790 nm) | 0.2 | 2.2 | 4.8 | 37 | 15 |
| 2 | copper phthalocyanine | vacuum vapor deposition | He—Ne (633 nm) | 0.6 | 1.6 | 2.7 | 40 | 10 |
| 3 | platinum bis (diphenyldithio-α-diketone) | vacuum vapor deposition | Laser Diode (790 nm) | 0.5 | 2.08 | 3.0 | 39 | 12 |
| 4 | platinum bis (di-p-isopropylphenyl-dithio-α-diketone) | vacuum vapor deposition | Laser Diode (790 nm) | 0.78 | 1.75 | 2.7 | 40 | 14 |
| 5 | fluorescin | vacuum vapor deposition | Ar (458 nm) | 0.36 | 1.84 | 3.0 | 40 | 11 |

Note:
*Required recording power is an irradiating power at which pit duty ratio reaches 50% when condensed by a condenser lens of numerical aperture of 0.5 and recorded at medium linear velocity of 1.24 m/sec.
**C/N value is measured by a spectrum analizer (IF 30 KHz).

As can be seen from the above Examples, the recording medium provided with the coloring matter film having the extinction coefficient of at least 1 in accordacne with the present invention has a reflectivity of not less than 16% and a C/N value of not less than 50 dB. In addition to these properties, it is preferable that the recording medium of the present invention should have an absorptivity of not less than 30%. Thus, the optical information recording medium of the present invention constituted as mentioned above has satisfactorily high reflectivity and C/N value useful for regenerating information and also satisfactorily high sensitivity useful for recording information.

What we claim is:

1. An optical information recording medium having a reflectivity of not less than 16% and an absorptivity of not less than 30%, comprising a transparent substrate having applied thereon a film of an organic coloring material, said organic coloring material being chemically inert to the substrate, wherein information is recorded on said recording medium by the thermal pit-forming action of laser light on said film of said organic coloring material when said laser light is irradiated through the transparent substrate, wherein said film of said organic coloring material has:

(a) an extinction coefficient of at least 1,
   (b) a film thickness of 200–1,000 Å and
   (c) no binder is contained in said film.

2. The optical information recording medium according to claim 1, wherein said coloring material is at least one of triphenyl methane type coloring matter, triarylmethane type coloring matter and cyanine type coloring matter.

3. The optical information recording medium according to claim 1, wherein said coloring material is at least one member selected from the group consisting of:

triarylmethane type coloring matter (1)

cyanine type coloring matter (2)

cyanine type coloring matter (3)

cyanine type coloring matter (4)

cyanine type coloring matter (5)

cyanine type coloring matter (6)

cyanine type coloring matter (7)

cyanine type coloring matter (8)

cyanine type coloring matter (9)

cyanine type coloring matter (10)

triphenylmethane type coloring matter (11)

cyanine type coloring matter (12)

cyanine type coloring matter (13)

cyanine type coloring matter (14)

cyanine type coloring matter (15)

cyanine type coloring matter (16)

-continued cyanine type coloring matter (17)

cyanine type coloring matter (18)

4. The optical information recording medium according to claim 1, wherein said substrate has a pre-groove.

5. The optical information recording medium according to claim 1, wherein said coloring material film contains a stabilizer.

6. The optical information recording medium according to claim 1, wherein said coloring material film has an extinction coefficient of not less than 1.5.

7. The optical information recording medium according to claim 1, wherein said coloring material film is formed by spin-coating.

8. An optical information recording medium having a reflectivity of not less than 16% and an absorptivity of not less than 30%, comprising a transparent substrate having applied thereon a film of an organic coloring material chemically inert to said substrate, said coloring film of said organic coloring material being sensitive to thermal pit formation on exposure to laser light irradiated through said substrate, said organic coloring material comprising at least one member selected from the group consisting of:

-continued said film of said organic coloring material being further characterized in that said film has:
(a) an extinction coefficient of at least 1,
(b) a film thickness of 200–1,000 Å, and
(c) no binder is contained in said film.

9. An optical information recording medium as claimed in claim 1, wherein a protective layer is formed over said organic coloring material film, said protective layer comprising a chemical selected from the group consisting of ionomer resins, polyamide resins, vinyl-type resins, natural high molecular compounds, silicone and liquid rubber, wherein said protective layer is less than an 0.1μ in thickness.

10. An optical information recording medium as claimed in claim 8, wherein a protective layer is formed over said organic coloring material film, said protective layer comprising a chemical selected from the group consisting of ionomer resins, polyamide resins, vinyl-type resins, natural high molecular compounds, silicone and liquid rubber, wherein said protective layer is less than 0.1$\mu$ in thickness.

11. An optical information recording medium as claimed in claim 1, wherein said recording medium further comprises an underlayer formed between said substrate and said film, said underlayer comprising a layer of Ag or Al and having a thickness of from 0.1–200$\mu$.

12. An optical information recording medium as claimed in claim 8, wherein said recording medium further comprises an underlayer formed between said substrate and said film, said underlayer comprising a layer of Ag or Al and having a thickness of from 0.1–200$\mu$.

13. An optical information recording medium having a reflectivity of not less than 16% and a C/N value of at least 50 dB, comprising a transparent substrate having applied thereon a film of an organic coloring material, said organic coloring material being chemically inert to the substrate, wherein information is recorded on said recording medium by the thermal pit-forming action of laser light on said film of said organic coloring material when said laser light is irradiated through the transparent substrate, wherein said film of said organic coloring material has:

(a) an extinction coefficient of at least 1, and
(b) no binder is contained in said film.

14. A method for optically recording information in permanent form, which comprises: optically imagewise exposing selected portions of an optical information recording medium as claimed in claim 13, by transmitting laser light through said substrate and against said film of organic coloring material so that said film absorbs said laser light and converts it to heat thereby forming a pattern of image-indicating pits in said film, said laser light having a wave length in which the extinction coefficient of said film is at least 1.

* * * * *